US012657007B2

(12) United States Patent (10) Patent No.: US 12,657,007 B2
Hamburg (45) Date of Patent: Jun. 16, 2026

(54) SIGN-BASED PARTIAL REDUCTION OF MODULAR OPERATIONS IN ARITHMETIC LOGIC UNITS

(71) Applicant: Cryptography Research, Inc., San Jose, CA (US)

(72) Inventor: Michael Alexander Hamburg, San Francisco, CA (US)

(73) Assignee: Cryptography Research, Inc., San Jose, CA (US)

( * ) Notice: Subject to any disclaimer, the term of this patent is extended or adjusted under 35 U.S.C. 154(b) by 470 days.

(21) Appl. No.: 17/309,935

(22) PCT Filed: Jan. 6, 2020

(86) PCT No.: PCT/US2020/012420
§ 371 (c)(1),
(2) Date: Jul. 1, 2021

(87) PCT Pub. No.: WO2020/146286
PCT Pub. Date: Jul. 16, 2020

(65) Prior Publication Data
US 2022/0060315 A1     Feb. 24, 2022

Related U.S. Application Data

(60) Provisional application No. 62/892,890, filed on Aug. 28, 2019, provisional application No. 62/789,103, filed on Jan. 7, 2019.

(51) Int. Cl.
*G06F 7/72* (2006.01)

(52) U.S. Cl.
CPC .............. *G06F 7/728* (2013.01); *G06F 7/727* (2013.01)

(58) Field of Classification Search
CPC ....... H04L 9/0618; H04L 9/0894; H04L 9/06; H04L 9/32; H04L 9/34; H04L 9/0643;
(Continued)

(56) References Cited

U.S. PATENT DOCUMENTS

| | | | | |
|---|---|---|---|---|
| 4,722,067 A | * | 1/1988 | Williams | .............. G06F 9/3552 |
| | | | | 712/E9.043 |
| 4,742,479 A | * | 5/1988 | Kloker | ..................... G06F 7/72 |
| | | | | 708/491 |

(Continued)

FOREIGN PATENT DOCUMENTS

| | | | | |
|---|---|---|---|---|
| JP | | 3979786 B2 | * 9/2007 | ........... G06F 7/5052 |
| WO | WO-2009-091748 A1 | | 7/2009 | |

OTHER PUBLICATIONS

Montgomery, Peter. Modular Multiplication without Trial Division, Dec. 19, 1983, www.ams.org/journals/mcom/1985-44-170/S0025-5718-1985-0777282-X/S0025-5718-1985-0777282-X.pdf. (Year: 1983).*

(Continued)

*Primary Examiner* — Andrew Caldwell
*Assistant Examiner* — Huy Duong
(74) *Attorney, Agent, or Firm* — Lowenstein Sandler LLP

(57) ABSTRACT

Aspects of the present disclosure involve a method and a system to execute the method to perform a cryptographic operation involving a modulo N computation, the method comprising loading a first integer number and a second integer number, wherein the first integer number and the second integer number are within an interval of 2N integer numbers, and performing an arithmetic operation involving the first integer number and the second integer number, wherein the arithmetic operation is to produce a third integer number, and wherein the arithmetic operation comprises a shifting operation to ensure that the third integer number is inside the interval of 2N integer numbers.

20 Claims, 8 Drawing Sheets

(58) Field of Classification Search
CPC ..... H04L 9/065; H04L 9/3218; H04L 9/3226;
H04L 9/3236; G06F 7/72–729
See application file for complete search history.

(56) References Cited

U.S. PATENT DOCUMENTS

| | | | |
|---|---|---|---|
| 5,144,574 A | | 9/1992 | Morita |
| 5,289,397 A | * | 2/1994 | Clark ...................... G06F 7/722 |
| | | | 708/518 |
| 8,781,112 B2 | | 7/2014 | Lambert |
| 2016/0350078 A1 | * | 12/2016 | Fenney ..................... G06F 5/01 |

OTHER PUBLICATIONS

Hennessy, John L., et al. Computer Architecture : A Quantitative
Approach, Elsevier Science & Technology, 2014. ProQuest Ebook
Central, http://ebookcentral.proquest.com /lib/uspto-ebooks/detail.
action?docID=404052. (Year: 2014).*
JP—3979786 (translated)—Cryptographic Processor With Share
Memory Wiring (Year: 2007).*
Baker, P.W., "Fast Computation of A*B Modulo N", Electronic
Letters, vol. 23, No. 15, Publication [online]. Jul. 16, 1987 [retrieved
Mar. 5, 2020]. Retrieved from the Internet: <URL: https://ieeexplore.
ieee.org/abstract/document/4257899>; pp. 794-795. 2 pages.
Notification of Transmittal of the International Search Report and
the Written Opinion of the International Searching Authority, or the
Declaration with Mail Date Mar. 25, 2020 re: Int'l Appln. No.
PCT/US2020/012420. 16 pages.

* cited by examiner

500
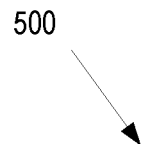
$Z \in [-N, N-1]$
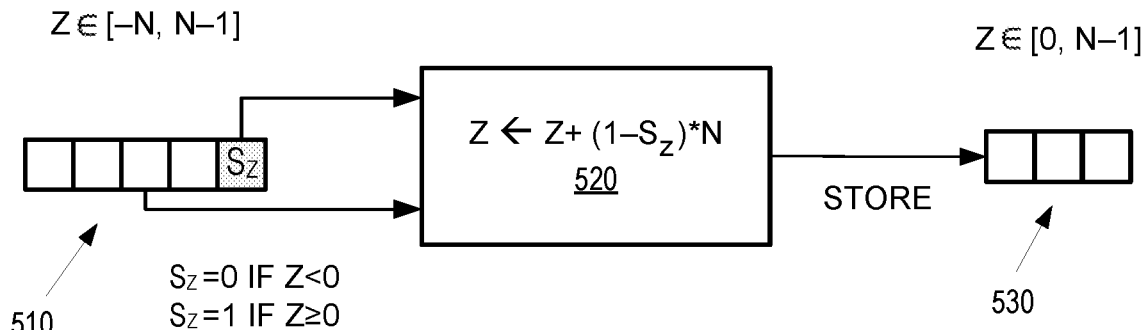
$$Z \leftarrow Z + (1 - S_z) * N$$
520
STORE
$Z \in [0, N-1]$
$S_z = 0$ IF $Z < 0$
$S_z = 1$ IF $Z \geq 0$
510
530
FIG. 5

600

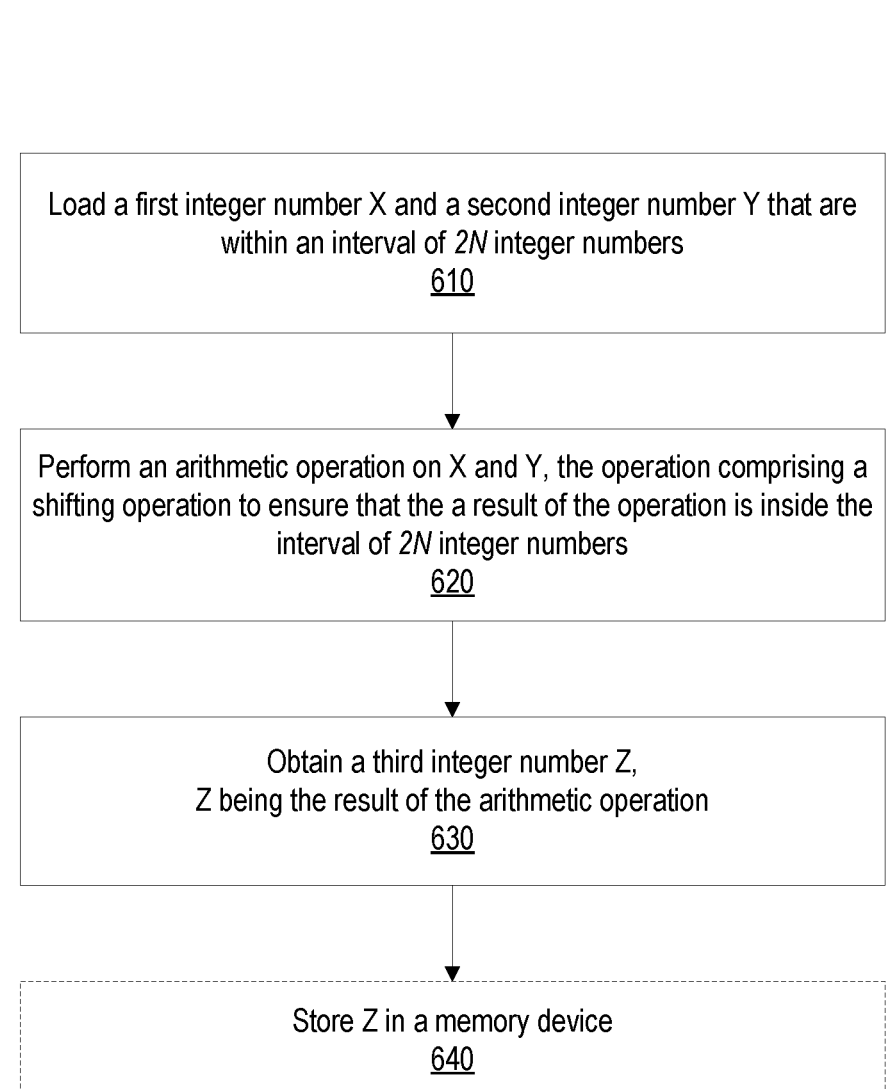

Load a first integer number X and a second integer number Y that are within an interval of *2N* integer numbers
610

Perform an arithmetic operation on X and Y, the operation comprising a shifting operation to ensure that the a result of the operation is inside the interval of *2N* integer numbers
620

Obtain a third integer number Z, Z being the result of the arithmetic operation
630

Store Z in a memory device
640

FIG. 6

SIGN-BASED PARTIAL REDUCTION OF MODULAR OPERATIONS IN ARITHMETIC LOGIC UNITS

RELATED APPLICATIONS

This application relates to U.S. Provisional Application No. 62/789,103 filed on Jan. 7, 2019, the entire contents of which are incorporated herein by reference.

TECHNICAL FIELD

The disclosure pertains to cryptographic computing applications, more specifically to implementations of arithmetic operations performed on computer hardware and software.

BRIEF DESCRIPTION OF THE DRAWINGS

The present disclosure will be understood more fully from the detailed description given below and from the accompanying drawings of various implementations of the disclosure.

FIG. 5 illustrates a final reduction operation of a sign-based partial reduction algorithm, in one exemplary implementation.

FIG. 6 depicts a flow diagram of an illustrative example of a method of sign-based partial reduction of modular arithmetic operations, in accordance with some aspects of the present disclosure.

DETAILED DESCRIPTION

Figure 1:
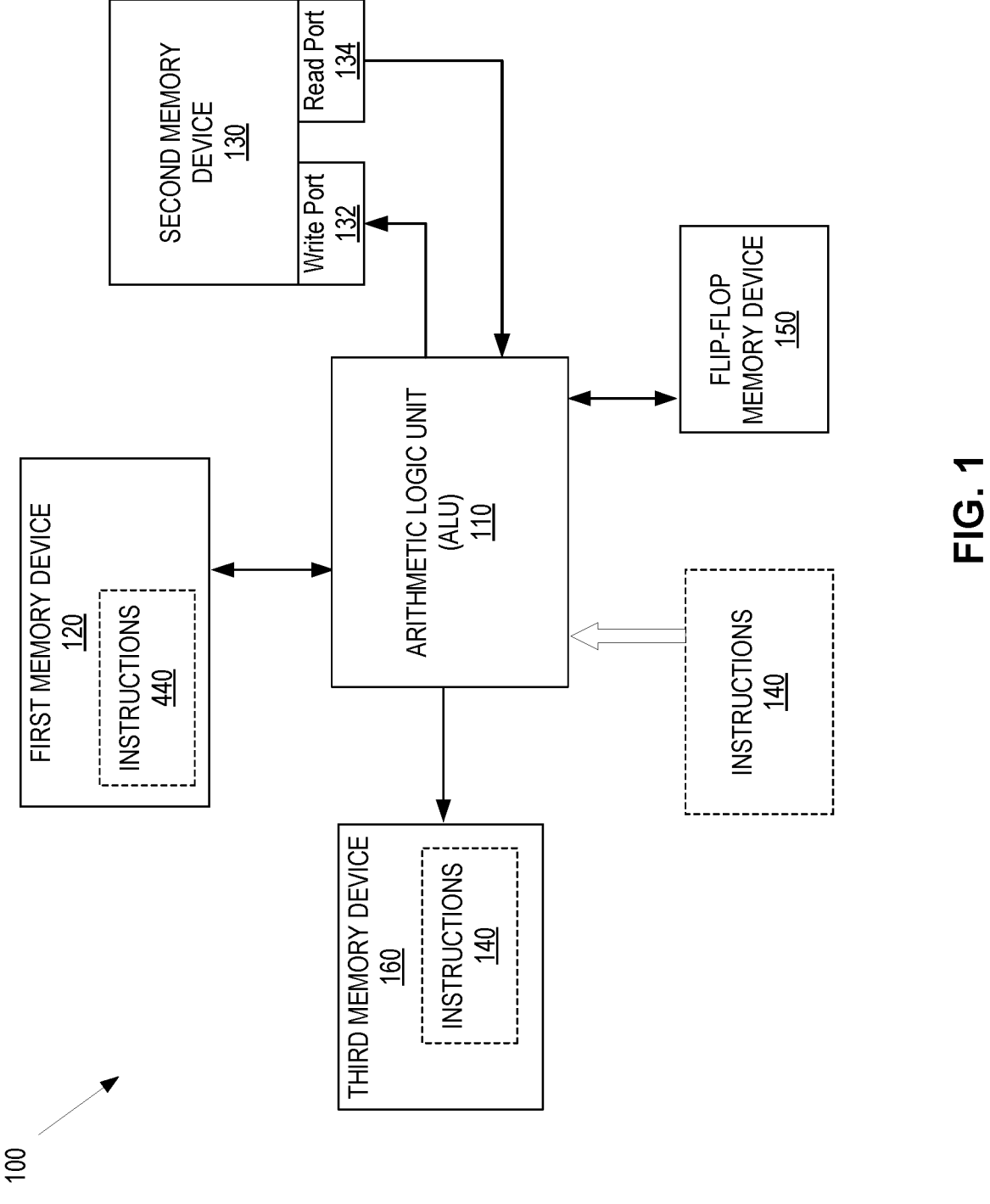
FIG. 1 is an exemplary block diagram of the components of a processing device capable of performing sign-based partial reduction of modular arithmetic operations, in accordance with one or more aspects of the present disclosure.

Aspects of the present disclosure are directed to sign-based partial reduction of modular arithmetic operations that may be used in applications employing cryptographic algorithms, for more efficient utilization of processing capabilities of computing devices.

In public-key cryptography systems, a processing device may have various components/modules used for cryptographic operations on input messages. Input messages used in such operations are often large binary numbers (e.g., multi-word integers) that require many clock cycles to be processed, especially when performed on low-bit microprocessors, such as smart card readers, wireless sensor nodes, and so on. Examples of cryptographic operations include, but are not limited to operations involving Rivest-Shamir-Adelman (RSA) and Diffie-Hellman (DH) keys, digital signature algorithms (DSA) used to authenticate messages transmitted between nodes of the public-key cryptography system, various elliptic curve cryptography schemes, etc. Cryptographic algorithms often involve modular arithmetic operations with modulus N, in which the set of all integers Z is wrapped around a circle of length N (the set $Z_N$), so that any two numbers that differ by N (or any other integer of N) are treated as the same number. As a result, a modular (modulo N) multiplication operation, AB mod N, may produce the same result for many more different sets of the multiplicand A and the multiplier B than for conventional arithmetic operations. For example, if it is known that a product of conventional multiplication of two positive integers is 6, it may then be determined that the two factors (the multiplicand and the multiplier, or vice versa) must necessarily be 2 and 3 (excluding a trivial product of 1 and the number itself, 6). In modular arithmetic, however, this is no longer the case. For example, if N=12, the same product AB mod 12=6 may result from the pairs of factors 2 and 3, 3 and 6, 5 and 6, 6 and 7, 6 and 9, and so on. This happens because 6, 18, 30, 42, 54, etc., represent the same number modulo N=12 because all these numbers differ from each other by an integer of N (in other words, when any of these integers is divided by N, the remainder of the division is the same, i.e. 6). Cryptographic applications exploit the fact that extracting the value of the private key A from a public key $P=B^A$ mod N may be a prohibitively difficult operation even when B is known, provided that A and N are sufficiently large. Similarly, a digital signature can be generated using a modular exponentiation technique. For example, when such algorithm is used as the basis of public-key cryptography, the signature S is computed in the form of the equation, $S=K^d$ mod P, where P is a public modulus, and d is a private exponent.

Calculations modulo N require performing a division operation to determine a remainder at the end. However, division operations are simple on paper but very expensive to perform on a computer hardware, especially if operands are large. Performing divisions is particularly challenging on embedded microprocessors with limited resources. To address this problem, an additional operation—a Montgomery reduction—is often used to find AB mod N. The Montgomery reduction involves a transformation into a Montgomery domain by first rescaling the multiplicand (i.e. performing an operation AR mod N) and the multiplier (BR mod N) by a number (Montgomery radix or an auxiliary modulus) R that is typically a power of the base r, e.g. $R=r^n$, with some exponent n such that $r^n>N$ (e.g. for N=87, the rescaling factor may be R=100). (The pair of the modulus N and the Montgomery radix R is usually selected in such a way that the two numbers have no common divisors other than 1). The Montgomery reduction utilizes selecting a reduction factor M such that when M is multiplied by N and added to the product (AR mod N)*(BR mod N), the result (AR mod N)*(BR mod N)+M*N, is divisible by R. For example, the last n digits of the result may be all zeros. These last digits may then be eliminated by right-shifting (which is one division operation—although rather simple—that is encountered in the Montgomery reduction technique) before the outcome is converted back from the Montgomery domain by one final multiplication by a fixed predetermined number (1/R) mod N.

One of significant challenges of computational cryptography is optimization of hardware resources for efficient carrying of various arithmetic operations—additions, subtractions, Montgomery multiplications, etc.—performed modulo N. A typical computational algorithm may include a substantial number of modular arithmetic operations. Each arithmetic operation may require a reduction step to bring its intermediate result into the interval [0, N−1]. The number of computational operations, required to perform such reduction steps, may add up quickly and significantly burden a processing device executing the computational algorithm. This may be especially disadvantageous for implementation of complex algorithms, particularly when microprocessors with limited resources (e.g., embedded microprocessors) are used.

Aspects of the present disclosure address this and other shortcomings of the conventional modulo N arithmetic computation by performing intermediate operations within an interval that may be expanded compared with the standard interval [0, N−1]. More specifically, in some implementations, the expanded interval [−N, N−1], which is twice larger than the standard interval, may be used. Because of the larger size of the expanded interval, a number of computational operations needed to bring a number X inside this interval (by adding or subtracting N an appropriate number of times) may be significantly less than in case of the narrower standard interval. Operations within the expanded interval may be enabled by the processing device keeping track of which half of the expanded interval the number X (and any other number Y, Z, . . . that may be present in the arithmetic operation being performed) belongs to. For example, an S-bit (e.g., a sign bit) may have value S=0 if the number X is negative (−N≤X<0) and may have value S=1 otherwise (when 0≤X). When the arithmetic operation involves two numbers, X and Y, having different values of the S-bit (e.g., one of the numbers is negative and one is positive), the sum X+Y is bound to be inside the expanded interval [−N, N−1] and no further action is needed on the part of the processing device. However, when both numbers are within the negative half of the expanded interval, their sum may fall outside the expanded interval, X+Y<−N. To account for such instances, the processing device may add N to the computed sum X+Y to ensure that the result X+Y+N remains within the expanded interval. In other instances, if both numbers X and Y are within the positive part of the expanded interval, their sum may fall outside it, X+Y≥N. To account for such instances, the processing device may subtract N from the computed sum X+Y to ensure that the result X+Y−N is still within the expanded interval. A similar computational procedure may be implemented in case of a modular multiplication of X and Y (explained if more detail in relation to FIG. 4).

FIG. 1 is an exemplary block diagram of the components of a processing device 100 capable of performing sign-based partial reduction of modular arithmetic operations, in accordance with one or more aspects of the present disclosure. "Processing device" refers to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module. "Memory device" herein refers to a volatile or non-volatile memory, such as random-access memory (RAM), read-only memory (ROM), electrically erasable programmable read-only memory (EEPROM), flash memory, flip-flop memory, or any other device capable of storing data.

As shown in FIG. 1, the processing device 100 may include, among other components, an ALU 110. The ALU 110 may be any digital electronic circuit capable of performing arithmetic and bitwise operations on integer binary numbers. The ALU 110 may be a component part of a bigger computing device, such as a central processing unit (CPU), which in turn may be a part of any server, desktop, laptop, tablet, phone, or any other type of computing device. The computing device may include multiple ALUs 110 and CPUs. The ALU 110 may receive input in the form of data operands from one or more memory devices, such as the memory devices 120, 130, 150, and 160. The ALU may also receive code/instructions input 140. The instructions 140 may indicate the nature and order of operations to be performed on input data operands. The instructions 140 may also indicate how output of the ALU operations is to be handled, in particular, what memory devices are to store the output of the ALU operations, and so on.

In one exemplary implementation, the numbers X and Y may be stored in a first memory device 120, which may be a RAM (e.g. SRAM or DRAM) device in one implementation. In other implementations, the first memory device 120 may be a flash memory device (NAND, NOR, 3DXP, or other type of flash memory) or any other type of memory. In one implementation, the first memory device 120 may have one input/output port and may be capable of receiving (via a write operation) or providing (via a read operation) a single operand to the ALU 110 per clock cycle. In such implementations, to perform both a read operation and a write operation involving the first memory device 120, a minimum of two clock cycles may be required.

A second memory device 130 may be a scratchpad memory device, in one implementation. The scratchpad may be any type of a high-speed memory circuit that may be used for temporary storage of data capable of being retrieved rapidly. To facilitate rapid exchange of data with the ALU 110, the second memory device 130 may be equipped with multiple ports, e.g. a write port 132 and a read port 134, in one implementation. Each port may facilitate one operation per clock cycle.

The numbers X and Y may be may be represented by n*W bits grouped into n words with W bits in each word. The size of the word W may be determined by micro-architectural properties of a processor performing multiplication, e.g, by an arithmetic logic unit (ALU) of the processor. For example, in one implementation, a number may be represented with n=8 words of W=32 bits in each word, for the total of 256 bits in the number. Per each clock cycle, the ALU 110 may load one word from the second memory device 130 (via a read port 134) and may output one word to the second memory device 130 (via a write port 132). In one implementation, the second memory device 130 may be used for storing accumulators during execution of various arithmetic operations, such as addition, subtraction, and multiplication, including Montgomery reduction.

In some implementations, the processing device 100 may have an additional memory device, which may be a flip-flop memory device 150. The flip-flop memory device 150 may be any electronic circuit having stable states to store binary data, which may be changed by appropriate input signals. The flip-flop memory device 150 may be used for storing carries during execution of addition, subtraction, and/or multiplication, in some implementations. In some implementations, the processing device 100 may optionally have a third memory device 160, which may be any aforementioned type of memory device. The third memory device 160 may be used to store results of intermediate steps of arithmetic operations and/or final results of such operations, in one implementaion. In some implementations, the third memory device 160 may be absent, and the intermediate/ final results may be stored in the second memory device 130 (e.g., the scratchpad memory) or writen to the first memory device 120, in one implementation. In some implementations, the first memory device 120 and/or the third memory device 160 may store instructions 140 for the ALU 110, as depicted in FIG. 1.

Figure 2:
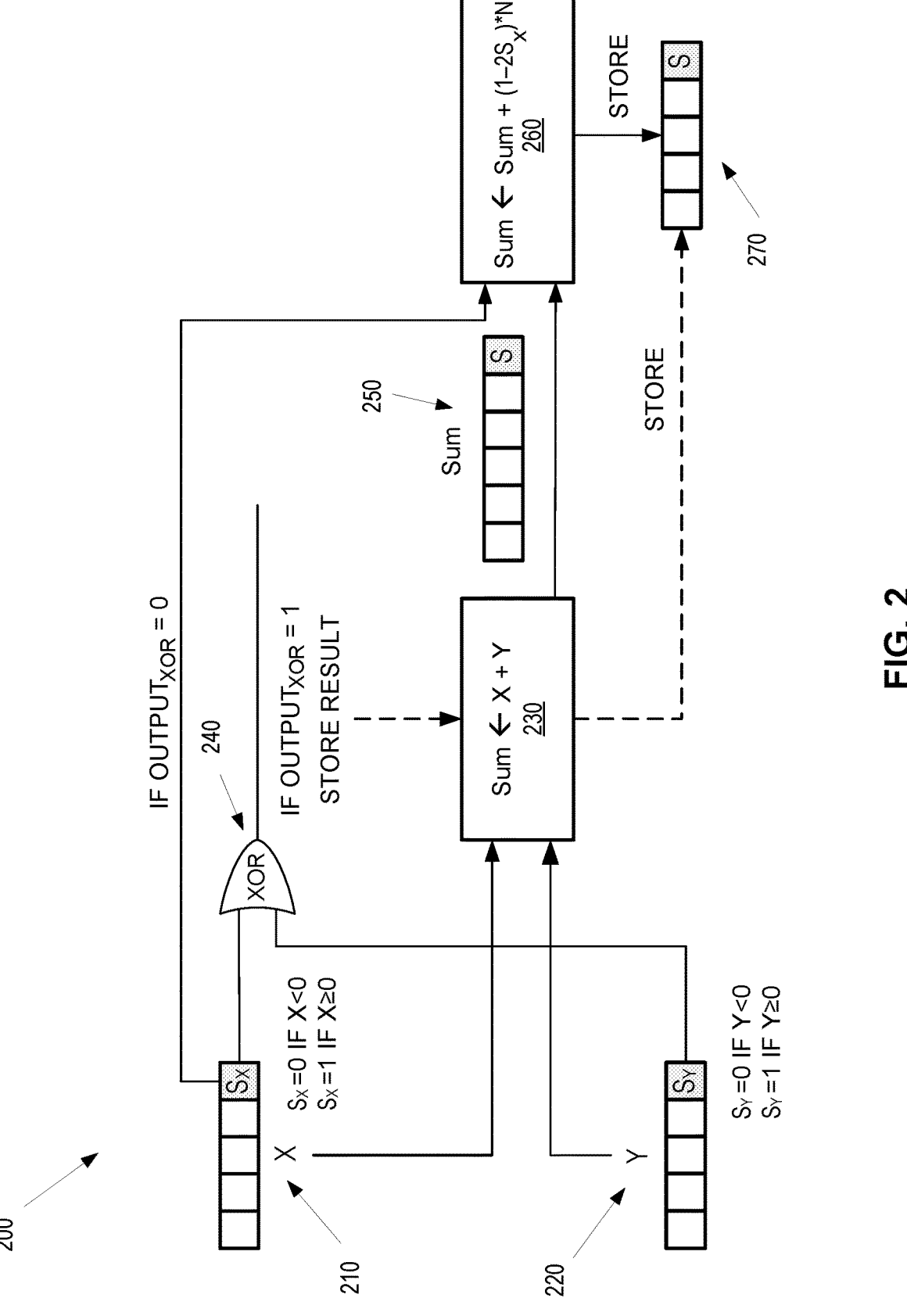
FIG. 2 illustrates a modular addition operation of a sign-based partial reduction algorithm, in one exemplary implementation.

FIG. 2 illustrates a modular addition operation 200 of a sign-based partial reduction algorithm, in one exemplary implementation. The exemplary operation 200 may be performed by one or more processing devices 100, in some implementations. The input of the exemplary operation 200 may be a number X 210 and a number Y 220. The number X and number Y may be integer numbers within an interval of 2N integer numbers. In some implementations, the interval of 2N integer numbers may be the [−N, N−1] interval. In other implementations, other contiguous intervals of 2N integer number may be used, e.g. the [−N+1, N] interval, or any interval [A−N, A+N−1] shifted by an integer A relative to the [−N, N−1] interval. In one implementation, the integer numbers X and Y may be loaded from the first memory device 120, from the second memory device 130, the third memory device 160, and/or the flip-flop memory device 150. In some implementations, one or both of the numbers X, Y may be a result of a previous arithmetic operation stored in the flip-flop memory device (e.g., a number representing a carry value) or in the scratchpad memory (e.g., a number representing an accumulator value).

The numbers X and Y may have a binary representation that uses $\log_2 N + 1$ bits to represent an absolute value of a number between 0 and N (indicated as white boxes in the depictions of numbers in FIG. 2), and an s-bit to indicate the sign of that number (depicted by shaded boxes in the depiction of numbers in FIG. 2). The s-bit may indicate whether a number belongs to a first subinterval of the interval of 2N integer numbers of to a second subinterval of the interval of 2N integer numbers. For example, in one implementation, the s-bit value S=0 of a given number may indicate that the number belongs to a negative half [−N, −1] of the interval [−N, N−1] whereas the value S=1 may indicate that the number belongs to the other half, e.g., [0, N−1], of the interval [−N, N−1]. In some implementations, the value S=1 may indicate the first half of the interval of 2N numbers whereas the value S=0 may indicate the second half of the same interval. In other implementations, where the interval is shifted, e.g., the interval is [A−N, A+N−1], different values of the s-bit may similarly indicate different subintervals (e.g., halves) of this shifted interval.

The processing device (e.g., ALU 110) performing the operation 200 may compute the sum X+Y (230). Before, after, or in parallel to this operation, the processing device may compare the values of the s-bits of the two adders, e.g. $S_X$ and $S_Y$. For example, in one implementation, this comparison may be performed by a (hardware- or software-implemented) logical XOR gate 240. (In other implementations, different logical gates may be used, such as an inverted XOR gate.) If the output of the logic operation 240 is 1 (meaning that the signs of X and Y are different), the sum X+Y is certain to be within the interval [−N, N−1]. Since no further action on the part of the processing device may be needed, the processing device may store (270) the result in one of the memory devices. If, however, it is determined that the signs of the two input numbers are the same, $S_X = S_Y$ (e.g., the XOR gate 240 outputs value 0), the processing device may perform a shifting operation 260. The shifting operation shifts the result X+Y by +N, if the input numbers are negative ($S_X = S_Y = 0$), and shifts the result X+Y by −N, if the input numbers are positive or zero ($S_X = S_Y = 1$). In one implementation, this shifting operation 260 may be performed as an operation, $X+Y+N*(1-2 S_X)$ as depicted in FIG. 2. In other implementations, the shifting operation 260 may first deploy a logical gate to determine the value of $S_X$ (or, equivalently, the value of $S_Y$, since both values are the same), and perform one of addition of N or subtraction of N, depending on the determined value of $S_X$. After performing the shifting operation 260, the processing device may store the shifted result in one of the memory devices. As schematically depicted in FIG. 2, the shifting operation may reduce the number of bits needed to store the sum value 250, Sum=X+Y. Because prior to shifting, the absolute value of Sum 250 may be as large as 2N, an additional bit may be necessary to represent Sum 250. After the shifting operation 260 is performed, the absolute value of Sum is returned back to within the [0, N] range.

Figure 3:
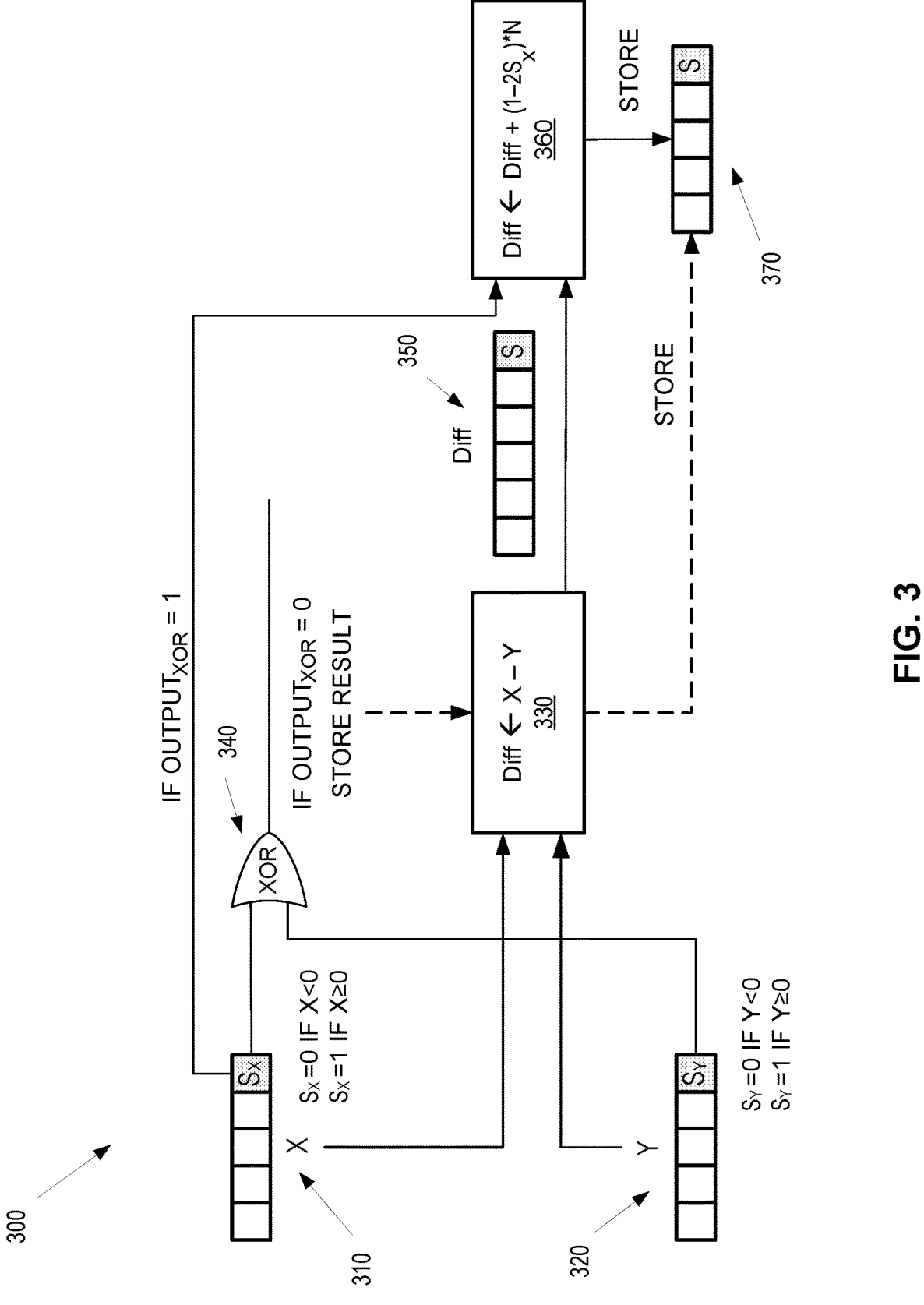
FIG. 3 illustrates a modular subtraction operation of a sign-based partial reduction algorithm, in one exemplary implementation.

FIG. 3 illustrates a modular subtraction operation 300 of a sign-based partial reduction algorithm, in one exemplary implementation. The exemplary operation 200 may be performed by one or more processing devices 100, in some implementations. The input of the exemplary operation 300 may be a number X 310 and a number Y 320, which may be integer numbers within an interval of 2N integer numbers, as described above in relation to FIG. 2. The binary representations of numbers X and Y may include s-bits $S_X$ and $S_Y$ to indicate to which subinterval of the interval of 2N integer numbers the corresponding numbers X and Y belong.

The processing device (e.g., ALU 110) performing the subtraction operation 300 may compute the difference X−Y (330). Before, after, or in parallel with this operation, the processing device may compare the values of the s-bits of the two input numbers, e.g. $S_X$ and $S_Y$. For example, in one implementation, this comparison may be performed by a (hardware- or software-implemented) logical XOR gate 340. (In other implementations, different logical gates may be used, such as an inverted XOR gate.) If the output of the logic operation 340 is 0 (meaning that the signs of X and Y are the same), the difference X−Y is certain to be within the interval [−N, N−1]. Since no further action on the part of the processing device may be needed, the processing device may store (370) the result in one of the memory devices. If, however, it is determined that the signs of the two input numbers are different, $S_X \neq S_Y$ (e.g., the XOR gate 340 outputs value 1), the processing device may perform a shifting operation 360. The shifting operation may shift the result X−Y by −N if number X is positive and number Y is negative ($S_X = 1$ and $S_Y = 0$) and shifts the result X−Y by +N if number X is negative and number Y is positive ($S_X = 0$ and $S_Y = 1$). In one implementation, this shifting operation may be performed as an operation, $X-Y+N*(1-2 S_X)$, as depicted in FIG. 3. In other implementations, the shifting operation may first deploy a logical gate (not shown) to determine the value of $S_X$ and perform one of addition of N or subtraction of N, depending on the determined value of $S_X$. After performing the shifting operation 360, the processing device may store (370) the shifted result in one of the memory devices. As schematically depicted in FIG. 3, the shifting operation may reduce the number of bits needed to store the difference value 350, Diff=X−Y. Because prior to shifting, the absolute value of Diff 350 may be as large as 2N, an additional bit may be necessary to represent the difference Diff 350. After the shifting operation 360 is performed, the absolute value of Diff is returned back to within the [0, N] range.

Figure 4:
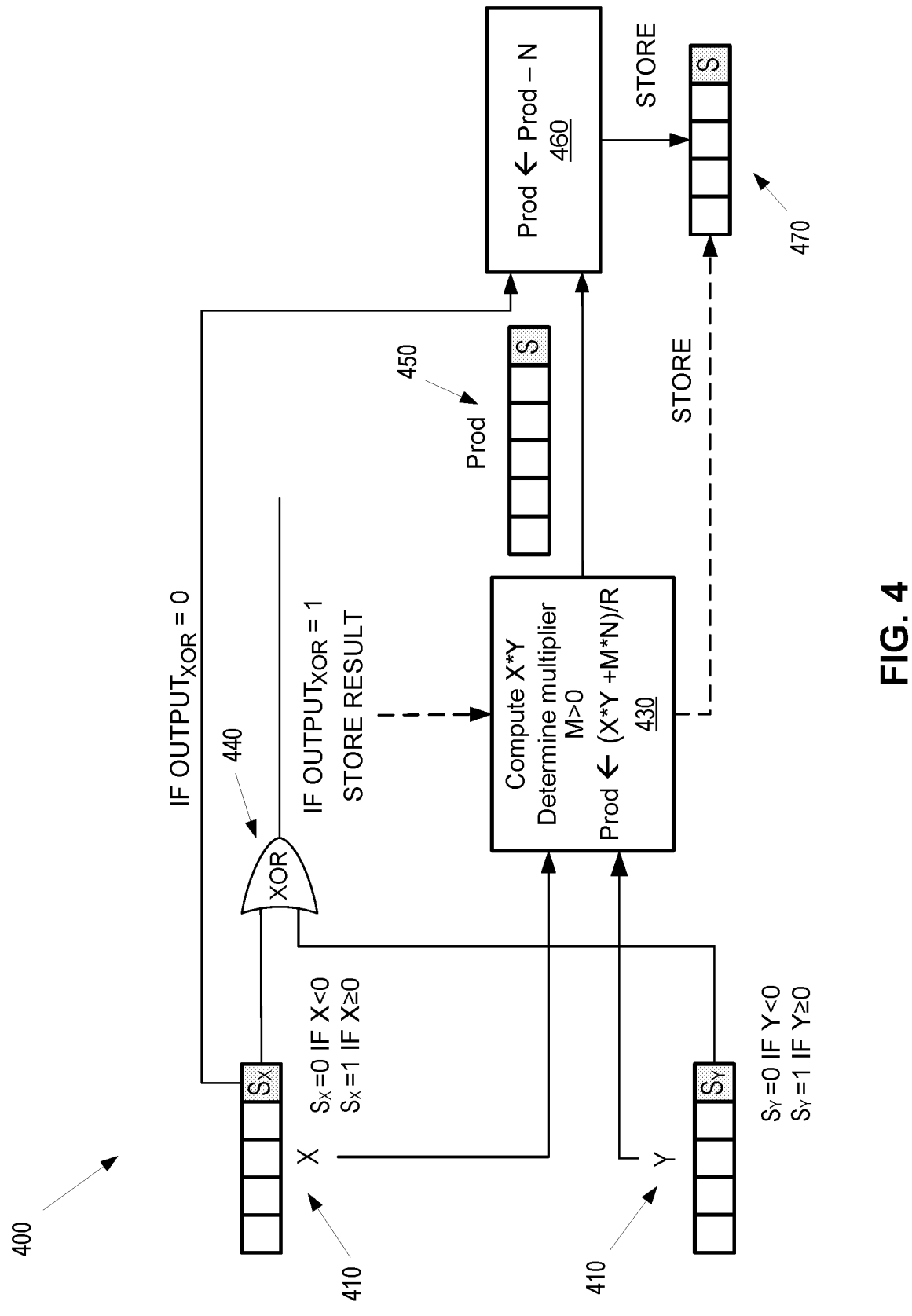
FIG. 4 illustrates a modular multiplication operation of a sign-based partial reduction algorithm, in one exemplary implementation.

FIG. 4 illustrates a modular multiplication operation 400 of a sign-based partial reduction algorithm, in one exemplary implementation. The exemplary operation 400 may be performed by one or more processing devices 100, in some implementations. The input of the exemplary operation 400 may be a number X 410 and a number Y 420, which may be integer numbers within an interval of 2N integer numbers, as described above in relation to FIG. 2. The numbers X and Y may be numbers in the Montgomery domain. The binary representations of numbers X and Y may include s-bits $S_X$ and $S_Y$ to indicate to which subinterval of the interval of 2N integer numbers the corresponding numbers X and Y belong.

The processing device (e.g., ALU 110) performing the modular multiplication operation 400 may compute the product X*Y (430). The processing device may further determine such a positive reduction factor M>0 that when Mis multiplied by N and added to the product X*Y, the result X*Y+M*N, is divisible by a Montgomery radix R. Before, after, or in parallel with these operations, the processing device may compare the values of the s-bits of the two input numbers, e.g. $S_X$ and $S_Y$. For example, in one implementation, this comparison may be performed by a (hardware- or software-implemented) logical XOR gate 440. (In other implementations, different logical gates may be used, such as an inverted XOR gate.) If the output of the logic operation 440 is 1 (meaning that the signs of X and Y are different), the Montgomery product Prod=(X*Y+M*N)/R is certain to be within the interval [-N, N-1]. This is because the absolute values $|X|$, $|Y| \le N \le R$, and because the reduction factor need not exceed the radix: M<R. Accordingly, the two addends X*Y/R and M*N/R have opposite signs and absolute values that are less than N, so that their sum has to be within the interval [-N, N-1]. Since no further action on the part of the processing device may be needed, the processing device may store (470) the result in one of the memory devices.

If, however, it is determined that the signs of the two input numbers are the same, $S_X = S_Y$ (e.g., the XOR gate 340 outputs value 0), at least for some input numbers X and Y the value Prod may exceed N-1. The processing device may then perform a shifting operation 360 by subtracting N from Prod. Alternatively, the processing device may shift the reduction factor, M→M-R during execution of the operations 430: Prod=(X*Y+(M-R)*N)/R. A single shifting operation M→M-R may suffices because the absolute values $|X|$, $|Y| \le N < R$, and because the reduction factor M<R. Accordingly, the two addends X*Y/R and M*N/R have the same signs and absolute values that are less than N, so that their sum is less than 2N.

The following example illustrates how the modular multiplication operation 400 of a sign-based partial reduction algorithm may work, in one instance. Suppose that the modular operations are modulo N=93 and the Montgomery domain is defined by the radix R=100. Suppose further that X=79 and Y=−86 are the input numbers of the multiplication operation. At block 430, the processing device may compute X*Y=−6,794. Using conventional methods of Montgomery reduction, it may then be determined that the reduction factor is M=58, so that M*N=5,394 and the sum X*Y+M*N=−6,794+5,394=−1,400 is an integer of the radix R=100. Accordingly, the Montgomery product to be stored is (X*Y+M*N)/R=−14, and is within the expanded interval [−93, 92].

If the input numbers have the same sign, e.g., X=79 and Y=86, the reduction factor for X*Y=6,794 is M=42 so that M*N=3,906 and the sum X*Y+M*N=10,700 is an integer of the radix R=100. But the corresponding Montgomery product, (X*Y+M*N)/R=107, may be outside the expanded interval [−93, 92]. Therefore, a shifting operation may preventively be used, by shifting the reduction factor according to M→M−R=42−100=−58. Accordingly, the product to be stored, Prod=(X*Y+(M−R)*N)/R=14, is inside the expanded interval [−93, 92].

In some instances, the unshifted Montgomery product of two numbers, e.g., X=34 and Y=47, may be inside the expanded interval [−93, 92]. With the reduction factor M=14, the unshifted Montgomery product is (X*Y+M*N)/R=29. The processing device may perform the shifting operation nonetheless, Prod=(X*Y+(M−R)*N)/R=−64, to spare the need to determine, on a case by case basis, whether an unshifted Montgomery product is within the target interval, since the two resulting numbers, e.g., 29 and −64, ultimately represent the same number modulo N=93.

After performing the shifting operation, the processing device may store (470) the shifted result in one of the memory devices. As schematically depicted in FIG. 4, the shifting operation may reduce the number of bits needed to store the Montgomery product value Prod 450. Because prior to shifting, the absolute value of Prod 450 may be as large as 2N, an additional bit may be necessary to represent the difference Prod 450. After the shifting operation 460 is performed, the absolute value of Prod is returned back to within the [0, N] range and the number of bits required to store the value of Prod may be reduced.

FIG. 5 illustrates a final reduction operation 500 of a sign-based partial reduction algorithm, in one exemplary implementation. The exemplary operation 500 may be performed by one or more processing devices 100, in some implementations. In some implementations, the sign-based partial reduction algorithm may be used to improve efficiency of execution of some other application algorithm, e.g., a cryptographic algorithm.

The application algorithm may include multiple parts where output of one part is used as an input of another part. The corresponding inputs/outputs may be expected to be integer numbers within the interval of N numbers, e.g., [0, N−1]. Correspondingly, while the partial reduction (to the interval of 2N numbers) may be sufficient for multiple operations within a given part of the application algorithm, a final reduction may have to be performed on a final result of that given part. The input of the exemplary final reduction operation 500 may be a number Z 510 within an interval of 2N integer numbers, as described above in relation to FIG. 2. The processing device (e.g., ALU 110) performing the final reduction operation 500 may c determine the value of the s-bit of the number Z. If $S_Z=1$, the number Z is already within the required interval [0, N−1] and no further action on the part of the processing device may be needed. The processing device may thus store (530) the value Z in one of the memory devices for use in the next part of the application algorithm. If, however, the number Z is a final result (e.g., the current step of the application algorithm is its last step), the processing device may transmit the number Z over a network, or otherwise handle it accordance with the application instructions. If, however, it is determined that $S_Z=0$ (and, accordingly, Z<0), the final reduction operation may shift the number Z by adding N to it: Z+N→Z. In some implementations, determination of the value of $S_Z$ may be performed via a logic gate (e.g., an XOR gate whose second input is a fixed signal 0 or 1). In other implementations, no separate determination of the value of $S_Z$ may be performed and the operation Z+ (1−$S_Z$)*N→Z may be performed for all Z within the expanded interval (such that for $S_Z$=1 no shifting occurs), as depicted in box 520 in FIG. 5. After the shifting operation of block 520 is performed, the shifted value Z may be stored/output/further processed/etc., as described above.

The modular arithmetic operations described herein that use sign-based partial reduction to an expanded interval of 2N integer numbers may be similarly implemented with reduction to even larger intervals, such as intervals of 4N (or more) of integer numbers. In such implementations, two (or more) bits—an s-word—may be used to indicate which subinterval of the expanded interval of 4N integer numbers the input numbers X and Y belong to. For example, the expanded interval [−2N, 2N−1] may consist of four subintervals indicated by a two-bit s-word:

[−2N, −N−1] (s-word: 00)
[−N, −1] (s-word: 01)
[0, N−1] (s-word: 10)
[N, −2N−1] (s-word: 11)

To ensure that a result of an arithmetic operation remains in the interval of 4N numbers, the processing device may perform a shifting operation on the results of the arithmetic operation provided that certain conditions on the s-words of the input numbers are met. For example, after an addition operation, the result may be shifted by −2N if both the s-words of X and Y are 11 or if one of the s-words is 11 while the other one is 10. Similarly, the result may be shifted by +2N if both the s-words of X and Y are 00 or if one of the s-words is 00 while the other s-word is 01. Corresponding rules may be set for subtraction and Montgomery multiplication operations. A final reduction of a word Z to the standard interval [0, N−1] may be performed by shifting Z by +2N, +N, or −N, depending on the value of the s-word of the number Z.

Figure 7:
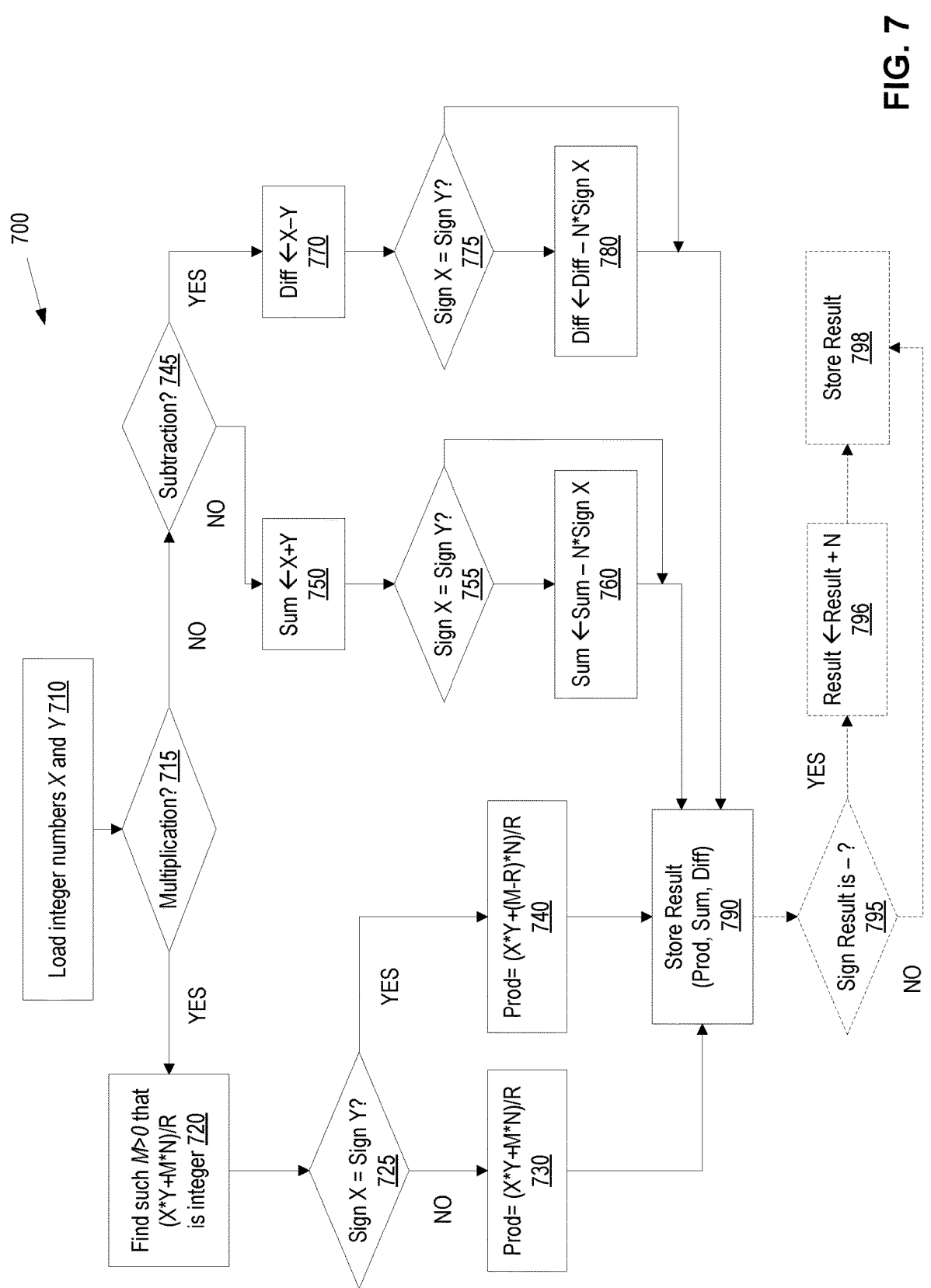
FIG. 7 depicts a flow diagram of another illustrative example of a method of sign-based partial reduction of modular arithmetic operations, in accordance with some aspects of the present disclosure.

FIG. 6 and FIG. 7 depict flow diagrams of illustrative examples of methods 600 and 700 of sign-based partial reduction of modular arithmetic operations, in accordance with some aspects of the present disclosure. Methods 600, 700 and/or each of their individual functions, routines, subroutines, or operations may be performed by one or more processing units of the computing system implementing the methods, e.g., a processor containing the ALU 110. In certain implementations, methods 600 and 700 may be performed by a single processing thread. Alternatively, methods 600 and 700 may be performed by two or more processing threads, each thread executing one or more individual functions, routines, subroutines, or operations of the method. In an illustrative example, the processing threads implementing methods 600 and 700 may be synchronized (e.g., using semaphores, critical sections, and/or other thread synchronization mechanisms). Alternatively, the processing threads implementing methods 600 and 700 may be executed asynchronously with respect to each other. Various blocks of the methods 600 and 700 may be performed in a different order compared to the order shown in FIGS. 6 and 7. Some blocks may be performed concurrently with other blocks. Some blocks may be optional.

The method 600 may begin with the processor/ALU loading a first integer number X and a second integer number Y (610). The numbers X and Y may be loaded from one or more registers of the processor, RAM (SRAM or DRAM), flash memory, scratchpad memory, flip-flop memory, or any other memory device, accessible to the processor via a bus, a network, etc. The loading of the first integer number and the second integer number may be to implement a modular arithmetic operation on the two numbers. The modular arithmetic operation may a modulo N operation. The first integer number X and the second integer number Y may be within an expanded interval of 2N integer numbers.

The method 600 may continue with the processing device performing an arithmetic operation involving the first integer number and the second integer number (620). The arithmetic operation may be an addition, a subtraction, a multiplication in a Montgomery domain, or any other modular arithmetic operation. The arithmetic operation may take the result of the arithmetic operation (e.g., X+Y, X−Y, X*M, etc.) outside the interval of 2N integer numbers. To ensure that the result of the arithmetic operation is returned inside the interval of 2N integer numbers, the processing device may perform a shifting operation. The shifting operation, in some implementations, may be performed as described above in relation to FIGS. 2-5. The shifting operation may be selected based on a relation of the first integer number and the second integer number to some reference number. The reference number may be near a middle of the interval of 2N integer numbers. For example, if the interval of 2N integer numbers extends from −N to N−1, the reference number may be 0, so that a shifting operation by +N may be selected if the relation between the first integer number and the second integer number to the reference number 0 is such that both the first integer number and the second integer number are less than the reference number 0. Similarly, a shifting operation by −N may be selected if the relation between the first integer number and the second integer number with the reference number 0 is such that both the first integer number and the second integer number are greater or equal than the reference number 0. In some implementations, to determine that the shifting operation is to be performed, the processing device may compare the values of the s-bits (sign bits) of the numbers X and Y. For some arithmetic operations (e.g., addition operations, Montgomery multiplication operations), the shifting operation may be performed if the s-bit values of the numbers X and Y are the same. For some operations (e.g., subtraction operations), the shifting operation may be performed if the s-bit values of the numbers X and Y are different.

At the conclusion of the arithmetic operation (that may include a shifting operation), the processing device may determine the result of the operation—a third integer number Z (630). The processing device may then use the third number Z as an input to another arithmetic operation, in some implementations. In other implementations, the processing device may communicate/transmit the third number over a network. In some implementations, the processing device may optionally store the third number Z in one or more memory devices (640), which may be one or more registers of the processor, RAM (SRAM or DRAM), flash memory, scratchpad memory, flip-flop memory, or any other memory device, accessible to the processor via a bus, a network, etc. In some implementations, the processing device may perform some combination of e.g., storing the third number Z and transmitting it over the network, etc.

FIG. 7 depict a flow diagram of another illustrative examples of method 700 of sign-based partial reduction of modular arithmetic operations, in accordance with some aspects of the present disclosure. The method 700 may begin with loading the first integer number X and the second integer number Y (710). In some implementations, one or more of X and Y may be already loaded into the ALU/processor performing the method 700. For example, one or more of X and Y may be a result of a previous arithmetic operation of the ALU/processor.

The processing device may receive instructions regarding a type of arithmetic operation to be performed. The operation may be a cryptographic application, such as a Montgomery-type cryptographic operation. For example, at block 715, the processing device may determine that the operation to be performed is a multiplication in a Montgomery domain with a Montgomery radix R. The processing device may perform multiplication X*Y and may also determine such a reduction factor M that being multiplied by N and added to the product X*Y yields an integer of R (720). The processing device may operate under instructions to find a reduction factor that is positive, M>0, in some implementations. In other implementations, the processing device may operate under instructions to find a reduction factor that is negative, M<0. At block 725, the processing device may determine if the signs of the two numbers X and Y are the same. If the signs are opposite, the processing device may conclude that the result (X*Y+M*N)/R is within the expanded interval [−N, N−1], so that no additional modification of the result is necessary (730). The processing device may then store, at block 790, the result (X*Y+M*N)/R→Prod as the Montgomery domain product of X and Y.

If, at block 725 it is determined that the signs of X and Y are the same, the result of the Montgomery multiplication reduction operation, (X*Y+M*N)/R, may, in some instances, fall outside the expanded interval [−N, N−1]. The processing device may then perform a shifting operation M→M−R and determine the product in the Montgomery domain as (X*Y+(M−R)*N)/R, at block 740, before storing the result (790).

In those implementations, where the processing device may operate under instructions to find the reduction factor that is negative, M<0, blocks 730 and 740 may be interchanged. More specifically, if the signs of X and Y are the same, a negative reduction factor M may ensure that Prod falls inside the expanded interval [−N, N−1]. To the contrary, if the signs of X and Y are opposite, a negative reduction factor may bring the Montgomery reduction product (X*Y+M*N)/R outside the expanded interval. In such instances, the processing device may perform a shifting operation at block 740 as follows: (X*Y+(M+R)*N)/R.

Referring back to block 715, the processing device may determine that instructions do not call for a multiplication operation. At block 745, the processing device may then determine if the arithmetic operation to be performed is a subtraction operation or an addition operation. If the operation to be performed is an addition operation, the processing device may determine the sum X+Y, at block 750. The processing device may also determine if the signs of X and Y are different (755), in which case the processing device may proceed with storing the sum (790), or outputting the sum according to instructions. If the signs of X and Y are the same, the processing device may perform a shifting operation (760), as described above in reference to FIG. 2, before storing the result (790).

Referring back to block 745, the processing device may determine that the arithmetic operation to be performed is a subtraction operation and compute the difference X−Y, at block 770. The processing device may also determine that the signs of X and Y are the same (775), in which case the processing device may proceed with storing the sum (790). If the signs of X and Y are opposite, the processing device may perform a shifting operation (780), as described above in reference to FIG. 3, before storing the result (790).

If the operation whose result stored at block 790 is a final operation of a partial reduction algorithm, the processing device may perform a set of (optional) operations 795, 796, and 798 to reduce the result from the expanded interval [−N, N−1] to the standard interval [0, N−1]. More specifically, at block 795, the processing device may determine that the sign of the result is negative. The processing device may then shift the result by +N (796) before storing the final result (798). If it is determined at block 796 that the sign of the result stored at block 790 is positive, no additional shifting operation may be needed and the processing device may store the result 790 as the final result (798). In some implementations, the processing device may not need to restore the result 790 at block 798, in which instance the block 798 may be performed.

Figure 8:
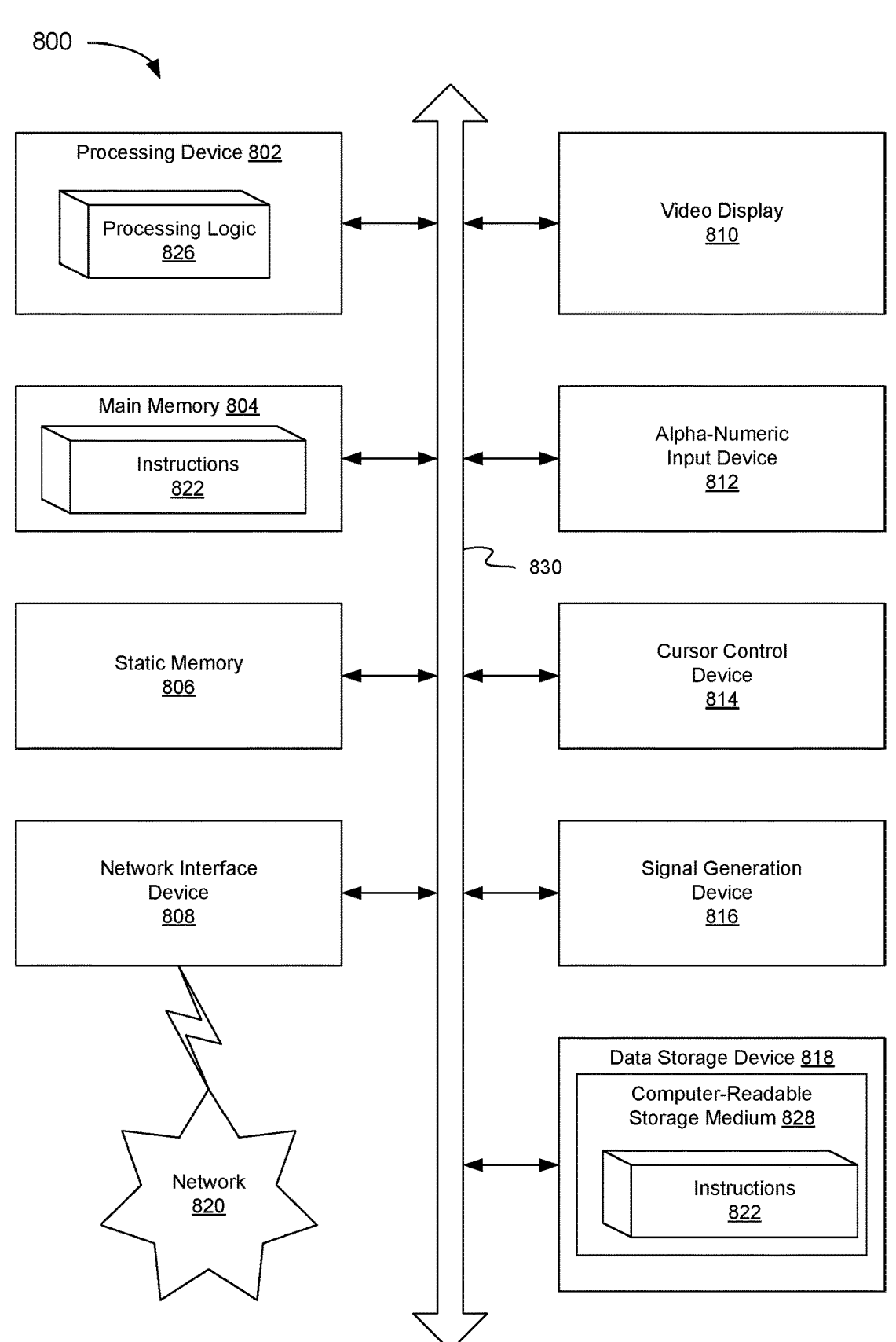
FIG. 8 depicts a block diagram of an example computer system operating in accordance with one or more aspects of the present disclosure.

FIG. 8 depicts a block diagram of an example computer system 800 operating in accordance with one or more aspects of the present disclosure. In various illustrative examples, computer system 800 may represent the processing device 100, illustrated in FIG. 1.

Example computer system 800 may be connected to other computer systems in a LAN, an intranet, an extranet, and/or the Internet. Computer system 800 may operate in the capacity of a server in a client-server network environment. Computer system 800 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 800 may include a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which may communicate with each other via a bus 830.

Processing device 802 represents one or more general-purpose processing devices such as a microprocessor, central processing unit, or the like. More particularly, processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 may be configured to execute instructions implementing method 600 or method 700 of sign-based partial reduction of modular arithmetic operations.

Example computer system 800 may further comprise a network interface device 808, which may be communicatively coupled to a network 820. Example computer system 800 may further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 may include a computer-readable storage medium (or, more specifically, a non-transitory computer-readable storage medium) 828 on which is stored one or more sets of executable instructions 822. In accordance with one or more aspects of the present disclosure, executable instructions 822 may comprise executable instructions implementing method 600 or method 700 of sign-based partial reduction of modular arithmetic operations.

Executable instructions 822 may also reside, completely or at least partially, within main memory 804 and/or within processing device 802 during execution thereof by example computer system 800, main memory 804 and processing device 802 also constituting computer-readable storage media. Executable instructions 822 may further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method to perform a modulo-N cryptographic operation, the method comprising:

identifying, by a processing device, one or more n-bit inputs into the modulo-N cryptographic operation, wherein n is equal or greater than 256, and wherein the one or more n-bit inputs are within a first interval of N integer numbers;

computing, by the processing device and based on the one or more n-bit inputs into the modulo-N cryptographic operation, a first integer number and a second integer number that are within a second interval of 2N integer numbers, wherein the second interval of 2N integer numbers comprises a first subinterval of N integer numbers and a second subinterval of N integer numbers, wherein each of the first integer number and the second integer number comprises a respective sign bit indicative of a subinterval associated with a respective integer number, and wherein each of the first integer number and the second integer number comprises a plurality of words;

performing, using an arithmetic logic unit (ALU) configured to process word-size inputs, an arithmetic operation comprising a plurality of cycles to obtain a third integer number, wherein at least one cycle of the plurality of cycles comprises:

loading, from a first memory device, a word of the plurality of words of at least one of the first integer number or the second integer number,

reading, using a read port of a dual-port second memory device, an accumulator word from the dual-port second memory device, computing, by the ALU and based at least on the word and the accumulator word, an updated accumulator word, and writing, using a write port of the dual-port second memory device, a previously computed accumulator word in the dual-port second memory device, wherein the reading and the writing are performed concurrently during a single cycle of the ALU; and wherein performing the arithmetic operation further comprises:

processing, by an XOR gate of the ALU, a first sign bit of the first integer number and a second sign bit of the second integer number to determine a selector bit;

applying a shifting operation, selected based on the selector bit, to the third integer number; and wherein the method further comprises:

obtaining an output of the modulo-N cryptographic operation using the third integer number, wherein the modulo-N cryptographic operation comprises one or more of:

an encryption of the one or more n-bit inputs, a decryption of the one or more n-bit inputs, or a digital signature for the one or more n-bit inputs.

2. The method of claim 1, wherein the second interval of 2N integer numbers extends from −N to N−1.

3. The method of claim 1, wherein the second interval of 2N integer numbers extends from −N+1 to N.

4. The method of claim 1, wherein the arithmetic operation comprises an addition operation, and wherein the shifting operation further comprises:

determining, using the first sign bit and the second sign bit, that the first integer number and the second integer number belong to a same subinterval of the second interval of 2N integer numbers.

5. The method of claim 4, wherein determining that the first integer number and the second integer number belong to the same subinterval of the second interval of 2N integer numbers comprises:

determining that the first sign bit of the first integer number coincides with the second sign bit of the second integer number.

6. The method of claim 4, wherein the shifting operation further comprises at least one of:

responsive to the first integer number being within the first subinterval of the second interval of 2N integer numbers, adding N to a sum of the first integer number and the second integer number; or responsive to the first integer number being within the second subinterval of the second interval of 2N integer numbers, subtracting N from the sum of the first integer number and the second integer number.

7. The method of claim 1, wherein the arithmetic operation further comprises a subtraction operation, and wherein the shifting operation comprises:

determining that the first integer number and the second integer number belong to different subintervals of the second interval of 2N integer numbers.

8. The method of claim 7, wherein determining that the first integer number and the second integer number belong to different subintervals of the second interval of 2N integer numbers comprises:

determining that the first sign bit of the first integer number is different from the second sign bit of the second integer number.

9. The method of claim 7, wherein the shifting operation further comprises at least one of:

responsive to the first integer number being within the first subinterval of the second interval of 2N integer numbers, adding N to a difference of the first integer number and the second integer number; or responsive to the first integer number being within the second subinterval of the second interval of 2N integer numbers, subtracting N from the difference of the first integer number and the second integer number.

10. The method of claim 1, wherein the arithmetic operation further comprises a multiplication operation, wherein the multiplication operation comprises determining a reduction factor M such that M multiplied by N and added to a product of the first integer number and the second integer number, produces a fourth integer number that is an integer of an auxiliary modulus R, and wherein the shifting operation comprises:

determining that the first integer number and the second integer number belong to a same subinterval of the second interval of 2N integer numbers.

11. The method of claim 10, wherein determining that the first integer number and the second integer number belong to the same subinterval of the second interval of 2N integer numbers comprises:

determining that the first sign bit of the first integer number coincides with the second sign bit of the second integer number.

12. The method of claim 10, wherein the shifting operation further comprises subtracting N from the fourth integer number to produce the third integer number.

13. The method of claim 10, wherein the shifting operation further comprises replacing M with M−R.

14. The method of claim 1, further comprising:

determining that the third integer number belongs to the first subinterval of the second interval of 2N integer numbers; and performing a reduction operation to shift the third integer number to the second subinterval of the second interval of 2N integer numbers, wherein the reduction operation comprises one of adding or subtracting N from the third integer number.

15. A system to perform a modulo-N cryptographic operation, the system comprising:

a first memory device;

a dual-port second memory device; and a processing device to:

identify one or more n-bit inputs into the modulo-N cryptographic operation, wherein n is equal or greater than 256, and wherein the one or more n-bit inputs are within a first interval of N integer numbers;

store, in the first memory device, a first integer number and a second integer number computed based on the one or more n-bit inputs into the modulo-N cryptographic operation, wherein the first integer number and the second integer number are within a second interval of 2N integer numbers, wherein the second interval of 2N integer numbers comprises a first subinterval of N integer numbers and a second subinterval of N integer numbers, wherein each of the first integer number and the second integer number comprises a respective sign bit indicative of a subinterval associated with a respective integer number, and wherein each of the first integer number and the second integer number comprises a plurality of words; and perform, using an arithmetic logic unit (ALU) config-
ured to process word-size inputs, an arithmetic
operation comprising a plurality of cycles to obtain
a third integer number, wherein at least one cycle of
the plurality of cycles comprises:

loading, from the first memory device, a word of the
plurality of words of at least one of the first integer
number or the second integer number, reading, using a read port of the dual-port second
memory device, an accumulator word from the
dual-port second memory device, computing, by the ALU and based at least on the
word and the accumulator word, an updated accu-
mulator word, and writing, using a write port of the dual-port second
memory device, a previously computed accumu-
lator word in the dual-port second memory device,
wherein the reading and the writing are performed
concurrently during a single cycle of the ALU, and wherein the arithmetic operation comprises:

processing, by an XOR gate of the ALU, a first sign bit
of the first integer number and a second sign bit of
the second integer number to determine a selector
bit; and applying a shifting operation, selected based on the
selector bit, to the third integer number; and wherein the processing device is further to:

obtain an output of the modulo-N cryptographic opera-
tion using the third integer number, wherein the
modulo-N cryptographic operation comprises one or
more of:

an encryption of the one or more n-bit inputs, a decryption of the one or more n-bit inputs, or a digital signature for the one or more n-bit inputs.

16. The system of claim 15, wherein the arithmetic
operation further comprises an addition operation, and
wherein the shifting operation comprises:

determining that the first integer number and the second
integer number belong to a same subinterval of the
second interval of 2N integer numbers.

17. The system of claim 15, wherein the arithmetic
operation further comprises a subtraction operation, and
wherein the shifting operation comprises:

determining, using the first sign bit and the second sign
bit, that the first integer number and the second integer
number belong to different subintervals of the second
interval of 2N integer numbers.

18. A non-transitory computer-readable medium storing
instructions thereon, wherein the instructions, when
executed by a processing device performing a modulo-N
cryptographic operation, cause the processing device to:

identify one or more n-bit inputs into the modulo-N
cryptographic operation, wherein n is equal or greater
than 256, and wherein the one or more n-bit inputs are
within a first interval of N integer numbers;

compute, based on the one or more n-bit inputs into the
modulo-N cryptographic operation, a first integer num-
ber and a second integer number that are within a
second interval of 2N integer numbers, wherein the second interval of 2N integer numbers comprises a first
subinterval of N integer numbers and a second subin-
terval of N integer numbers, wherein each of the first
integer number and the second integer number com-
prises a respective sign bit indicative of a subinterval
associated with a respective integer number, and
wherein each of the first integer number and the second
integer number comprises a plurality of words;

perform, using an arithmetic logic unit (ALU) configured
to process word-size inputs, an arithmetic operation
comprising a plurality of cycles to obtain a third integer
number, wherein at least one cycle of the plurality of
cycles comprises:

loading, from a first memory device, a word of the
plurality of words of at least one of the first integer
number or the second integer number, reading, using a read port of a dual-port second
memory device, an accumulator word from the dual-
port second memory device, computing, by the ALU and based at least on the word
and the accumulator word, an updated accumulator
word, and writing, using a write port of the dual-port second
memory device, a previously computed accumulator
word in the dual-port second memory device,
wherein the reading and the writing are performed
concurrently during a single cycle of the ALU; and wherein performing the arithmetic operation further com-
prises:

processing, by an XOR gate of the ALU, a first sign bit
of the first integer number and a second sign bit of
the second integer number to determine a selector
bit; and applying a shifting operation, selected based on the
selector bit, to the third integer number; and wherein the processing device is further to:

obtain an output of the modulo-N cryptographic operation
using the third integer number, wherein the modulo-N
cryptographic operation comprises one or more of:

an encryption of the one or more n-bit inputs, a decryption of the one or more n-bit inputs, or a digital signature for the one or more n-bit inputs.

19. The non-transitory computer-readable medium of
claim 18, wherein the arithmetic operation comprises an
addition operation, and wherein the shifting operation com-
prises:

determining that the first integer number and the second
integer number belong to a same subinterval of the
second interval of 2N integer numbers.

20. The non-transitory computer-readable medium of
claim 18, wherein the arithmetic operation comprises a
subtraction operation, and wherein the shifting operation
comprises:

determining, using the first sign bit and the second sign
bit, that the first integer number and the second integer
number belong to different subintervals of the second
interval of 2N integer numbers.

* * * * *